United States Patent
Zhou

(10) Patent No.: US 9,429,268 B2
(45) Date of Patent: Aug. 30, 2016

(54) DOCK CHARGER WITH SLIDABLE CONNECTOR

(75) Inventor: Cong-Bing Zhou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 1108 days.

(21) Appl. No.: 13/050,957

(22) Filed: Mar. 18, 2011

(65) Prior Publication Data
US 2012/0161706 A1    Jun. 28, 2012

(30) Foreign Application Priority Data
Dec. 28, 2010   (CN) .......................... 2010 1 0609201

(51) Int. Cl.
| H02J 7/00 | (2006.01) |
| F16M 13/00 | (2006.01) |
| F16M 11/04 | (2006.01) |
| F16M 11/22 | (2006.01) |
| G06F 1/16 | (2006.01) |

(52) U.S. Cl.
CPC ............ *F16M 13/00* (2013.01); *F16M 11/041* (2013.01); *F16M 11/22* (2013.01); *G06F 1/1632* (2013.01)

(58) Field of Classification Search
USPC .......................................................... 320/115
See application file for complete search history.

(56) References Cited

U.S. PATENT DOCUMENTS

| 6,016,046 A * | 1/2000 | Kaite et al. ................... 320/108 |
| 6,154,010 A * | 11/2000 | Geiger .......................... 320/137 |
| 6,864,798 B2 * | 3/2005 | Janik ........................ 340/693.11 |
| 6,891,351 B2 * | 5/2005 | Chen ............................ 320/115 |
| 6,926,130 B2 * | 8/2005 | Skowronski ............. 191/12.2 R |
| 7,076,270 B2 * | 7/2006 | Jaggers et al. ............. 455/556.1 |
| 2005/0168189 A1 * | 8/2005 | Schweigert ................... 320/107 |
| 2007/0260798 A1 * | 11/2007 | Griffin, Jr. .................... 710/303 |
| 2009/0073642 A1 | 3/2009 | Jubelirer et al. |
| 2009/0267561 A1 * | 10/2009 | Lin ............................... 320/108 |

FOREIGN PATENT DOCUMENTS

| CN | 101888050 A | 11/2010 |
| TW | M268757 U | 6/2005 |

* cited by examiner

*Primary Examiner* — Yalkew Fantu
(74) *Attorney, Agent, or Firm* — Zhigang Ma

(57) ABSTRACT

A dock charger includes a main body and a connector. The main body includes a rear surface and a bottom surface cooperatively defining a recess for receiving one end of an electronic device therein. The rear surface defines a first through opening. The connector is slidably received in the first through opening and able to slide out of the first through opening to connect with the electronic device.

9 Claims, 6 Drawing Sheets

DOCK CHARGER WITH SLIDABLE CONNECTOR

BACKGROUND

1. Technical Field

The present disclosure relates to dock chargers, and especially to a dock charger with a slidable connector.

2. Description of Related Art

For electronic devices, such as digital photo frames (DPFs) and pad style personal computers, a dock charger is usually needed. The dock charger provides a perfect viewing angle for the users while viewing. Although the conventional dock charger satisfies the basic requirement, there is still a need for a new dock charger.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
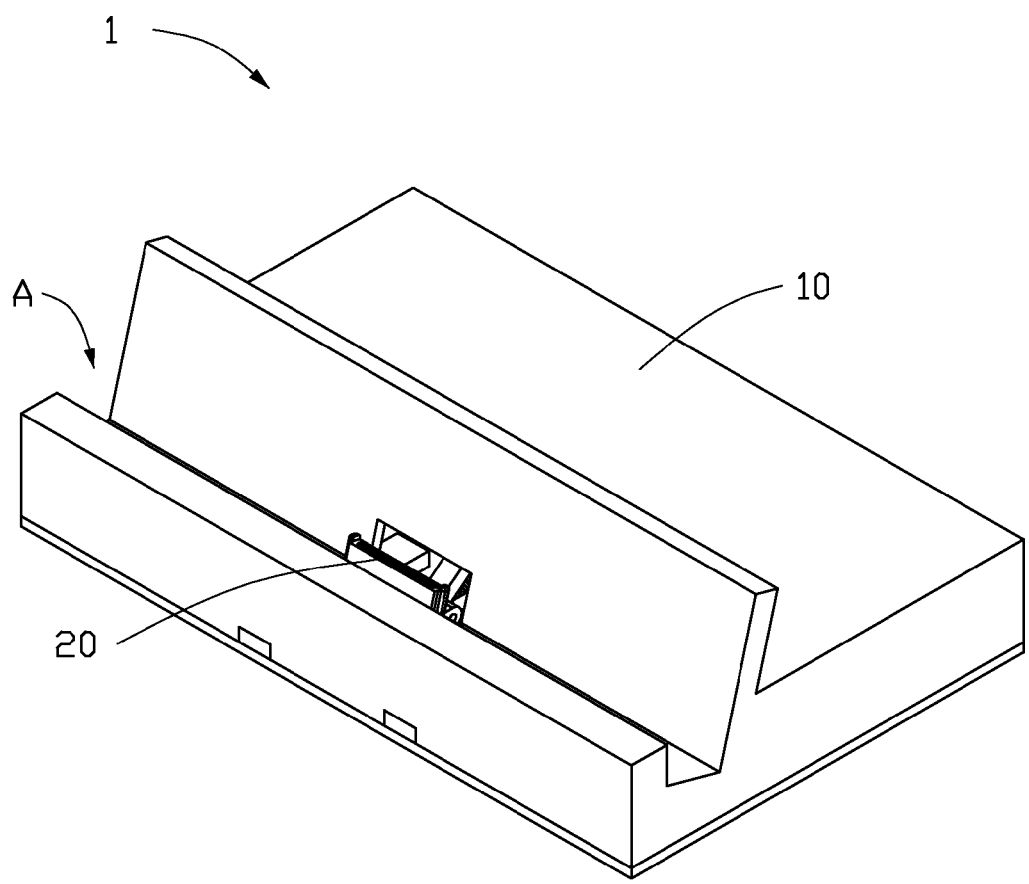
FIG. 1 is an isometric view of a dock charger according to an exemplary embodiment.
Figure 2:
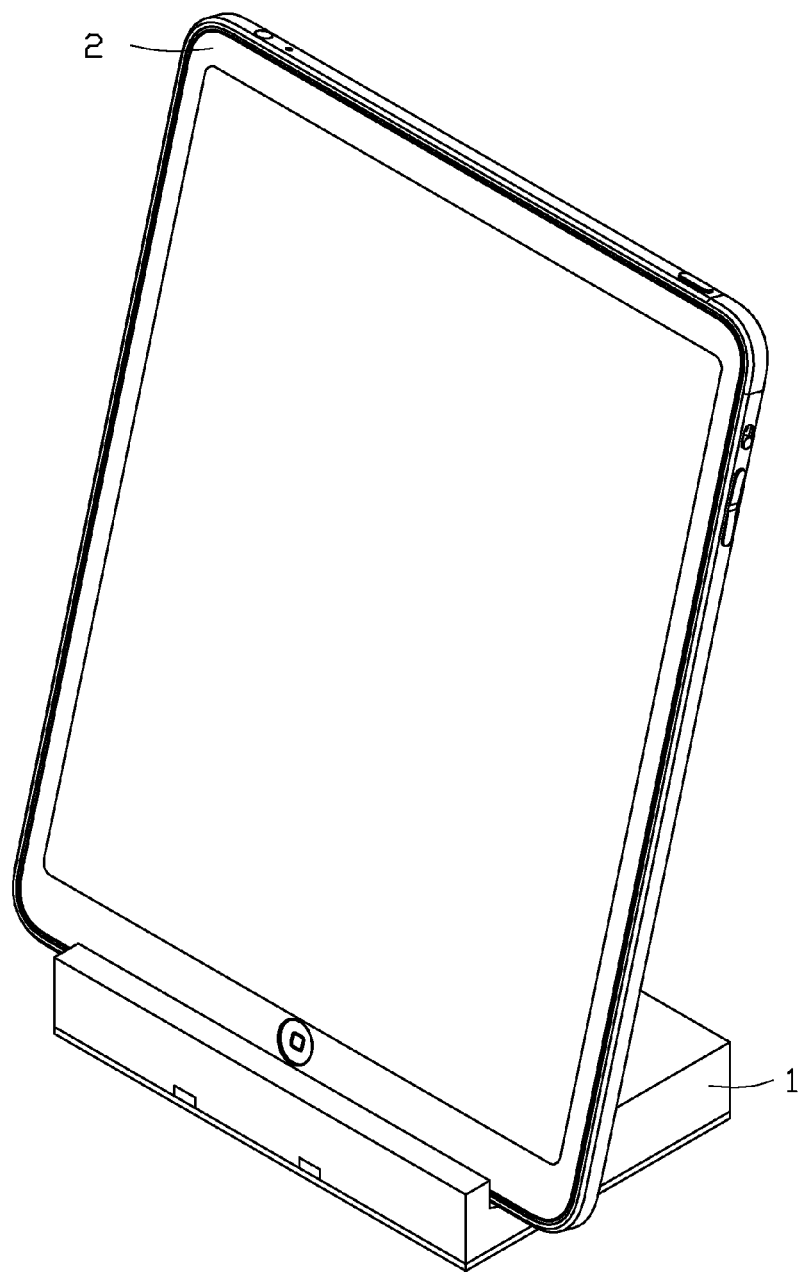
FIG. 2 is an isometric view, showing an electronic device is placed on the dock charger of FIG. 1.

Referring to FIGS. 1 and 2, a dock charger 1 according to an exemplary embodiment is illustrated. The dock charger 1 includes a main body 10 defining a recess A and a connector 20 slidably retained within the recess A. One end of an electronic device 2 is capable of being retained within the recess A and connected to the connector 20.

Figure 3:
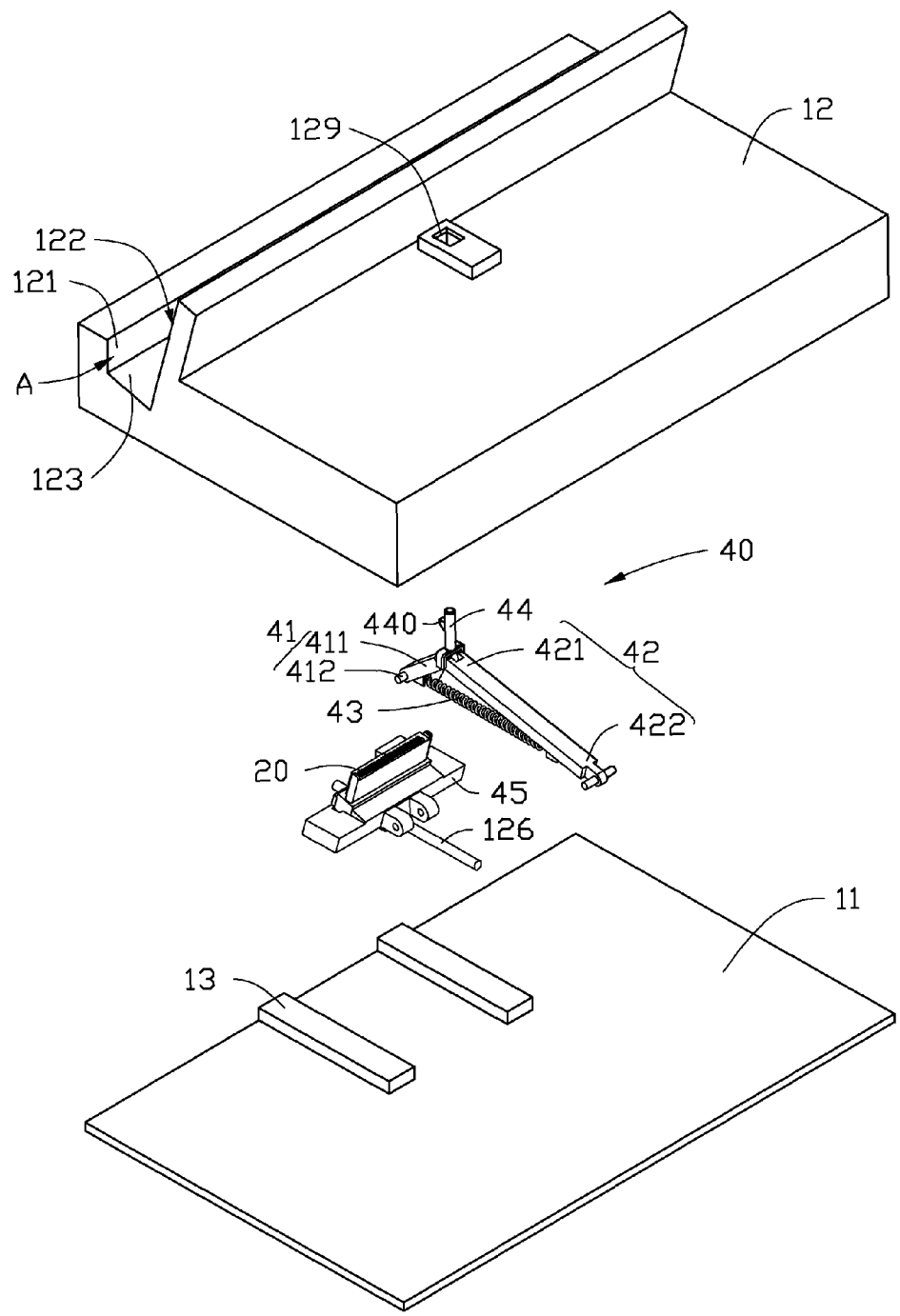
FIG. 3 is an exploded, isometric view of the dock charger of FIG. 1.

Referring to FIG. 3, the main body 10 includes a base plate 11 and a housing 12 disposed on the base plate 11. Two parallel support bars 13 are formed on the base 11.

Figure 4:
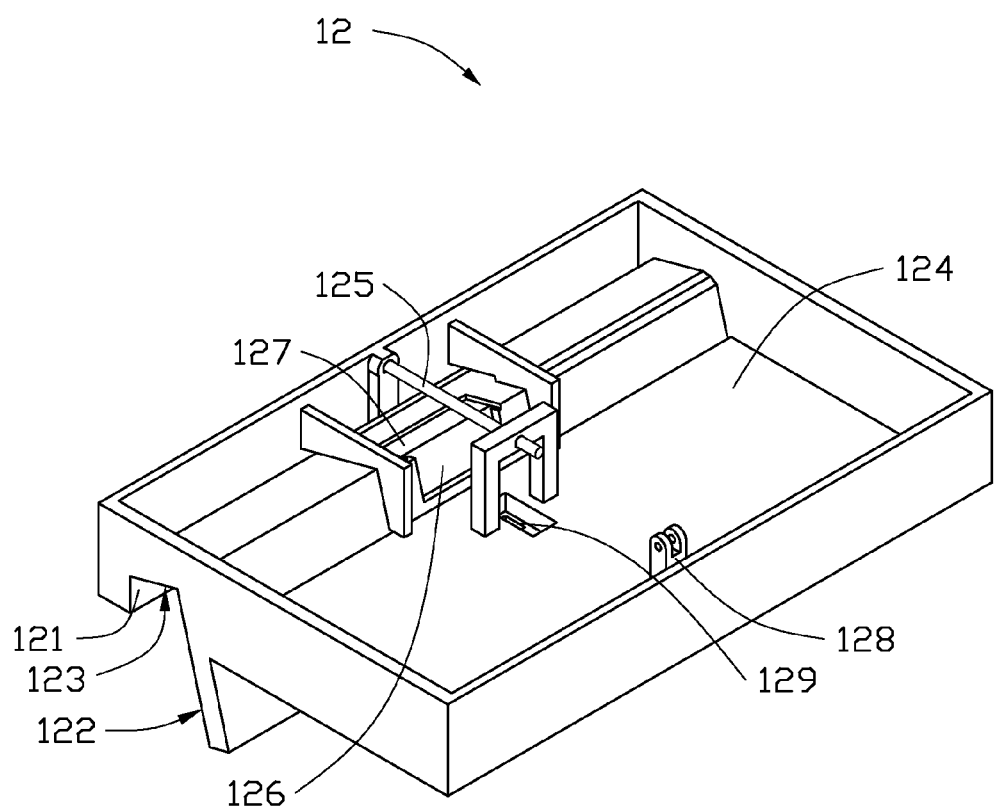
FIG. 4 is an isometric view of a housing of the dock charger of FIG. 1.

Referring also to FIG. 4, a top side of the housing 12 includes a front surface 121, a rear surface 122 facing the front surface 121, and a bottom surface 123 connecting between the front surface 121 and the rear surface 122. The front surface 121, the rear surface 122, and the bottom surface 123 cooperatively define the recess A. The electronic device 2 is capable of leaning on the rear surface 122, and the front surface 121 prevents the electronic device 2 from disengaging from the recess A. In the embodiment, the rear surface 122 extends perpendicular to the bottom surface 123. The rear surface 122 defines a first through opening 126, and the bottom surface 123 defines a second through opening 127 communicating with the first through opening 126. A bottom side of the housing 12 defines a receiving space 124. The first through opening 126 and the second through opening 127 both communicate with the receiving space 124. The receiving space 124 includes a guide rod 125 hanging over the receiving space 124 and a fixing tab 128 extending perpendicularly from a bottom thereof, and defines a third through opening 129 opposing one end of the guide rod 125.

The dock charger 1 further includes a driving mechanism 40 retained within the receiving space 124. The driving mechanism 40 includes a first connecting rod 41, a second connecting rod 42, an elastic member 43, a handling rod 44, and a sliding member 45. The first connecting rod 41 includes a first end 411 and an opposite second end 412. The second connecting rod 42 includes a third end 421 and an opposite fourth end 422. The first end 411 and the third end 421 are pivotally connected with each other, the second end 412 is pivotally connected to the sliding member 45, and the fourth end 422 is pivotally connected to the fixing tab 128 of the housing 12. Two opposite ends of the elastic member 43 are respectively fixed to the second end 412 and the fourth end 422. The handling rod 44 includes a latching protrusion 440 on its lateral surface. One end of the handling rod 44 is fixed to the third end 422 of the second connecting rod 42, and an opposite end extends through the third through opening 129. The sliding member 45 is disposed on the support bars 13 of the main body 10, and the connector 45 is fixed on the sliding member 45. The guide rod 125 extends through the sliding member 45, and thus the sliding member 45 is capable of sliding along the guide rod 125 as driven by the first connecting rod 41.

Figure 5:
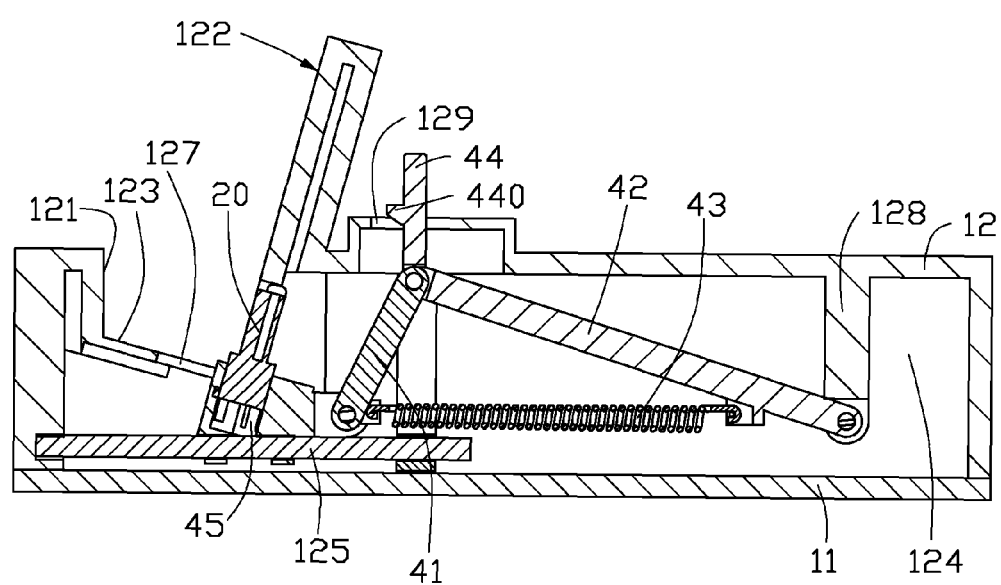
FIGS. 5 and 6 are cross-sectional views of the dock charger of FIG. 1, showing the dock charger in two states.

Referring to FIG. 5, normally, the connector 20 is received in the through opening 127 of the housing 12, the latching protrusion 440 of the handling rod 44 disengages from the edge of the third through opening 129, and the elastic member 43 is not elastically deformed.

Figure 6:
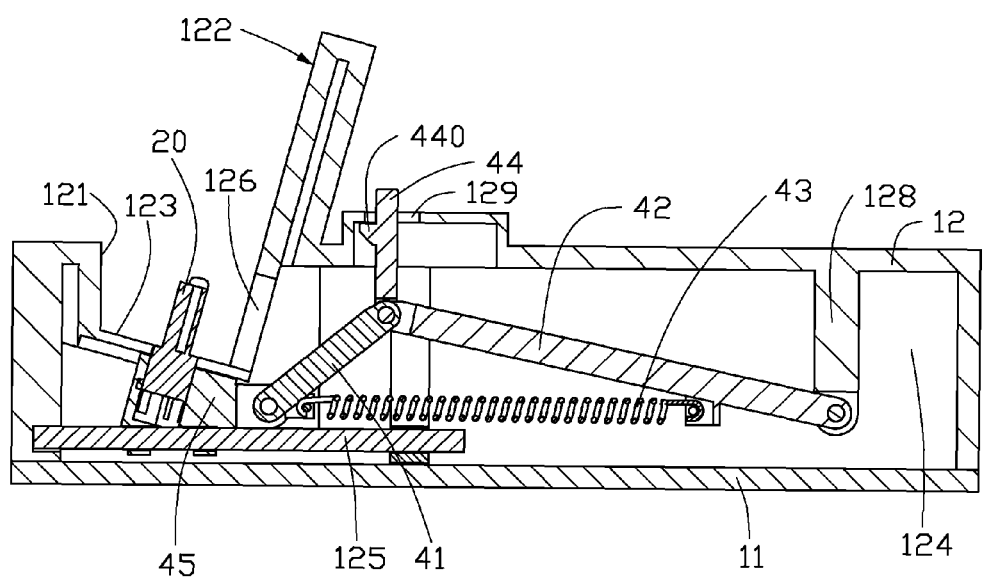

Referring to FIG. 6, when needed, the handling rod 44 is moved downward until the latching protrusion 440 engages the edge of third through opening 129, and the elastic member 43 is stretched. The connector 20 then slides along the first through opening 126 till it gets to the middle of the recess A. Thus, the electronic device 2 that is disposed in the recess A is capable of connecting with the connector 20.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A dock charger for charging an electronic device, the dock charger comprising:
   a housing comprising a rear surface and a bottom surface connected to each other, wherein the rear surface and the bottom surface cooperatively define a recess therebetween for receiving one end of an electronic device therein, and the rear surface defines a first through opening therein; and
   a connector slidably connected to the housing and slidable between a first position where the connector is received in the first through opening and a second position where the connector is exposing out of the first through opening to connect with the electronic device.

2. The dock charger as described in claim 1, wherein the bottom surface defines a second through opening communicating with the first through opening of the rear surface, and the connector is slidable along the second through opening.

3. The dock charger as described in claim 1, wherein the rear surface is substantially perpendicular to the bottom surface.

4. The dock charger as described in claim 1, wherein the main body further comprises a front surface connected to the bottom surface and facing the rear surface to prevent the electronic device from disengaging from the recess.

5. The dock charger as described in claim 1, further comprising a driving mechanism, wherein the housing defines a receiving space, and the driving mechanism is received in the receiving space and is configured to move the connector out of the first through opening.

6. The dock charger as described in claim 5, wherein the housing comprises a guide rod hanging over the receiving space, the driving mechanism comprises a first connecting rod comprising a first end and an opposite second end, a second connecting rod comprising a third end and an opposite fourth end, and a sliding member fixing the connector, the first end and the third end are pivotally connected together, the first end is pivotally connected to the sliding member, the fourth end is pivotally connected the housing, the guide rod extends through the sliding member, and thus the sliding member is capable of moving the connector along the guiding rod.

7. The dock charger as described in claim 6, wherein the housing further defines a third through opening, the driving mechanism further comprises:

a handling rod with one end fixed to the third end and an opposite end extending through the third through opening, the handling rod comprising a latching protrusion on a lateral surface thereof; and an elastic member with opposite ends fixed to the second end of the first connecting rod and the fourth end of the second connecting rod;

wherein when the connector slides to the first position, the latching protrusion of the handling rod disengages from an edge of the third through opening, and the elastic member is not elastically deformed; and when the connector slides to the second position, the latching protrusion of the handling rod engages the edge of third through opening, and the elastic member is stretched.

8. The dock charger as described in claim 5, further comprising a base plate coupled to the housing for sealing the receiving space.

9. A dock charger for charging an electronic device, the dock charger comprising:

a housing comprising a rear surface and a bottom surface cooperatively defining a recess therebetween for receiving one end of an electronic device therein, the rear surface defining a first through opening; and a connector movably connected to the housing and switchable between a first position where the connector is received in the first through opening, and a second position where the connector is exposing out of the first through opening to connect with the electronic device.

* * * * *